ns Patent Office
3,842,159
Patented Oct. 15, 1974

3,842,159
METAL CATALYSTS AND METHOD
Leonard M. Niebylski, Birmingham, and Peter A. Immethun, Ferndale, Mich., assignors to Ethyl Corporation, Richmond, Va.
No Drawing. Continuation-in-part of abandoned application Ser. No. 211,732, Dec. 23, 1971. This application June 21, 1972, Ser. No 264,907
Int. Cl. B01d 53/34
U.S. Cl. 423—213.5                    7 Claims

ABSTRACT OF THE DISCLOSURE

Nickel with a surface deposit of a noble metal (e.g., palladium) and an alkali metal compound (e.g., lithium oxide) is useful as an exhaust gas catalyst. The noble metal and alkali metal compound may be deposited by contacting nickel with solutions of the noble metal and alkali metal compound. More than one deposition can be used. If a first deposition of palladium is followed by contacting the nickel with strong nitric acid, a second palladium deposition will result in an increased amount of palladium on the nickel surface. The nickel can optionally be heated after deposition of the noble metal to improve catalytic activity. Preferably this heating is accomplished by exposing the nickel having a noble metal deposit thereon to hot engine exhaust gas and then applying the alkali metal compound.

This application is a continuation-in-part of application Ser. No. 211,732, filed Dec. 23, 1971 now abandoned.

BACKGROUND OF THE INVENTION

In recent years extensive research has been devoted to the alleviation of air pollution in many metropolitan areas. Part of this effort has been directed to methods of reducing the hydrocarbons, carbon monoxide and nitrogen oxides emitted with the exhaust gas of internal combustion engines. Various catalytic converter systems have been proposed to accomplish this purpose. With such systems the exhaust gases are passed through a catalytic bed wherein the noxious materials are converted to an inactive form.

Among the catalysts disclosed in the prior art are the supported nickel catalysts of Gross et al., U.S. 3,370,914. That patent also teaches emission reduction with certain nickel additives in gasoline. The catalytic reaction of hydrogen with nitric oxide in the presence of oxygen has been studied using a noble metal supported on alumina; Jones et al., *Environmental Science and Technology*, 5, No. 9, September (1971), page 790 et seq. The catalytic decomposition of nitric oxide by metallic oxides has also been studied; Winter, *Journal of Catalysis*, 22, 158–170 (1971). Application of Monel metal to automotive $NO_x$ emissions control has been reported; Bernstein, Kearby, Raman, Vardi, and Wigg, *SAE Paper No. 70014*, presented at January 1971 meeting, Detroit, Mich.

A particularly troublesome problem is the removal of nitrogen oxides ($NO_x$) from exhaust gas. In the past, several catalysts have been found to be effective in reducing exhaust $NO_x$ when the engine is operated at a rich air/fuel (A/F) ratio such that the exhaust gas contains a substantial amount of carbon monoxide and only small amounts (e.g., less than 0.5 percent) of oxygen. The present-day trend is to operate engines at lean A/F ratios at or slightly above stoichiometric in order to reduce overall emissions. When an engine is operated at an A/F ratio above stoichiometric the carbon monoxide content of the exhaust gas drops sharply and the oxygen content increases to about 0.8–3 percent or more. Under these conditions, catalysts previously used are generally ineffective in reducing $NO_x$ in engine exhaust. Accordingly, a need exists for an exhaust gas catalyst that will not only reduce $NO_x$ and other undesirable components in exhaust gas under rich operating conditions but will also retain activity at A/F ratios at and above stoichiometric.

SUMMARY OF THE INVENTION

This invention pertains to massive nickel having a surface deposit thereon of a catalytic promoter quantity of a noble metal and alkali metal compound. Preferably, the noble metal is rhodium, palladium, or platinum, more preferably palladium. Preferably, lithium, sodium, or potassium oxide are used, most preferably lithium.

This invention also pertains to a method of diminishing the amount of undesirable components in exhaust gas, which method comprises contacting engine exhaust with nickel having a noble metal and alkali metal compound deposited thereon. These catalysts are especially effective in reducing $NO_x$ content of exhaust gas.

DESCRIPTION OF PREFERRED EMBODIMENTS

A preferred embodiment of this invention is massive nickel having a surface deposit thereon of a catalytic promoter quantity of a noble metal and an alkali metal compound. Herein, the term "massive nickel" is used to include nickel in a macroscopic object or objects, and is used to exclude (a) the form or forms of nickel impregnated on catalyst supports and (b) the microscopic nickel particles obtainable by decomposition of nickel compounds in a gaseous or liquid medium. By the term as used herein, in denoted nickel objects having sufficient mass of nickel that common physical properties of nickel, e.g., melting point, are discernible. Thus, the term refers to nickel in a solid state where the mass of nickel is such that the common physical properties and surface characteristics, rather than just surface effects, characterize the metal mass.

The nickel metal may be in many forms such as powders, either fine or coarse, turnings, sheet, lath, wires, screens, sintered objects, foams, etc. The foams can be prepared, for example, by using the process of U.S. 2,983,597; 2,895,819; 3,300,296; 3,297,431; 2,917,384 or 3,111,396. When foaming by use of a metal hydride or similar foaming agent, the mass to be foamed may be made more viscous by using a viscosity increasing agent as per the teachings of Belgian Pat. 746,135. Likewise, nickel may be plated or coated on such forms of other metals. In general, such nickel plates will be at least 0.001 inch thick. The nickel may be pure, substantially pure, or an alloy of nickel. In general, the alloy should contain at least about 60 percent nickel and preferably, at least about 80 percent by weight. The nickel coats can be mechanically applied by screws or the like, or can be brazed or welded on. Likewise, the plate or coat can be made by hot sintering, coining, dipping, metallizing, pressure cladding, pouring, and burnishing. Likewise, electrophoresis, electrolytic plating, electrochemical plating, vacuum sputtering, vapor plating, and similar processes known in the art can be used.

Noble metals which may be used in this invention are rhodium, palladium, iridium, and platinum. Preferably, rhodium, palladium, or platinum is used and more preferably palladium.

It is only necessary that a promoter quantity of noble metal be present at the surface of the nickel. How this amount is achieved is not critical. One can use objects made of a nickel-noble metal alloy, if desired. However, such forms are usually expensive and, accordingly, it is desirable from the economic viewpoint to treat the surface of the nickel, rather than compose the whole object of nickel-noble metal alloy. When using a surface deposit the amount of noble metal ranges from about 0.05 to about 1 percent by weight, especially from about 0.1 to 0.4 weight percent.

One can deposit noble metal such as palladium by contacting the nickel to be treated with a liquid such as water containing palladium ions in solution.

Usually one prefers to use an aqueous solution having a pH less than 7, because acidic solutions tend to keep palladium ions in solution rather than precipitating. In general, one prefers to use a solution having a pH in the range of about 2.0 to about 6.5, but other acid systems can be used. When necessary, the pH can be adjusted to the desired level with acid such as nitric, sulfuric, or hydrochloric acid or other acid, either organic or inorganic. The nature or composition of the acid used to adjust the pH is not critical.

One can use any convenient source of noble metal ions, such as a salt of such metals. Nitrates, bromide, sulfate, chlorides, and the like, can be used; however, the nature of the anion is not critical.

The concentration of the noble metal salt is not critical. Saturated or more dilute solutions can be used. In general, solutions of concentration of from about 0.5 to about 15 weight percent are employed. These afford a reasonable deposition rate.

The solution temperature is not critical. Solutions at ambient or higher or lower temperatures can be employed. Mildly elevated temperatures are preferred. In general, good results are achieved using temperatures from about 25° to about 75° C., 48°–52° C. being preferred.

The deposition is not pressure dependent, ambient pressures are conveniently employed; greater or lesser pressures can be used if desired. Ambient atmosphere as well as inert atmospheres such as neon or argon blankets can be used.

It has been noted that the deposition of noble metal such as palladium will cease after a while even when using solutions in which palladium ions were still available for deposition. Although not bound by any theory, it appears the nickel surface becomes inert to deposition or "passive."

This state can be overcome by immersing or otherwise contacting the nickel being treated in $HNO_3$ or other similar oxidizing acid. The nitric acid concentration employed is not critical; but generally is from about 5 volume percent to about 55 volume percent, preferably from about 25 volume percent to about 50 volume percent; however, greater or lesser amounts can be used. The temperature of the acid can be from about 75° F. to about 180° F., preferably 90° F. to 120° F. Hotter or cooler acids can be used for the temperature is not critical. Acids at ambient and mildly elevated temperature are conveniently used.

Other acids can be used. Mixtures of applicable acids can be employed. Thus, one may use mixtures of nitric acid and hydrochloric acid, 1:3 to 1:5. In addition, one may use phosphoric acid, 3 volumes, nitric acid, 1 volume, and sulfuric acid, 1 volume. Still another applicable mixture is nitric acid, 3 volumes, sulfuric acid, 1 volume, orthophosphoric acid, 1 volume, and glacial acetic acid, 5 volumes.

Also, one may return the nickel surface to activity by conducting an electrolytic etch in the presence of either 10 percent phosphoric acid; 20 percent perchloric acid in ethanol; 10 percent perchloric acid and 90 percent acetic acid; 50 percent sulfuric acid; acetic acid with 7 percent water and 5 percent $CrO_3$; sulfuric acid, 13–15 weight percent, plus 56–63 weight percent orthophosphoric acid, remainder water; sodium chloride, 15 ounces per gallon plus HCl, 0.5 ounce per gallon; or sodium chloride, 7 ounces per gallon plus sodium nitrite, 3 ounces per gallon.

The time of contacting the metal with the acid is not critical; it is only necessary to activate the metal surface. As a general rule, etching away an excessive amount of metal by acid action is not desirable. For the acid concentration above, contacting times within the the range of from about 0.25 minute to about 5 minutes, and preferably from about 0.5 minute to about 2 minutes, are used. Shorter and longer times can be employed if desired.

After acid treatment, recontacting with a solution of noble metal ions of the type and according to the process described above can be conducted if additional deposition is desired.

The acid treatment can be followed with a water wash or rinse, if desired, but use of such wash or rinse is not critical.

Alkali metal is applied to the nickel surface in essentially the same manner as the noble metal deposit either before, after, or at the same time as depositing a noble metal. Thus, one uses an aqueous solution having a pH less than 7 and prefers to use solutions having a pH of about 2.0–6.5. The pH can be achieved by adjusting with acid as described above. Solutions having higher or lower pH can be used if desired.

Similarly, any convenient source of alkali metal ions can be used. Thus, alkali metal halides, carbonates, acetate, and nitrates are preferred, but the nature of the anion is not critical. Any convenient concentration can be used from saturated to more dilute solutions. In general, solutions of concentration of from about 0.5 weight percent to about 15 weight percent are preferred, more preferably, from about 1.0 weight percent to about 5 weight percent.

As above, the solution temperature is not critical, and the temperature range given above is suitable. Deposition is not temperature dependent and ambient atmosphere can be used. Inert atmospheres are not required but can be used if desired.

More than one deposition of alkali metal values can be utilized if desired. Also, alkali metal values and noble metal can be deposited from a solution of alkali and noble metal salts.

The alkali metal values which are deposited are transformed at least partially to the corresponding oxide under use conditions. Similar transformation to the oxides can be achieved by heating in air the nickel with alkali metal values deposited thereon prior to exposing the catalyst to use conditions. However, during use, the particular form of alkali metal compounds actually present on the surface varies with the environment to which it is exposed. For example, when damp, the oxide may revert to hydroxide. In high carbon dioxide atmospheres at low temperature the oxide can form carbonates. Some may be converted to sulfites or sulfates by exposure to sulfur oxides formed when operating on a sulfur-containing fuel. The particular form of alkali metal compound is not critical since only the presence of the alkali metal cation is required. For this reason, it is preferred to refer to the alkali metal deposit as a surface deposit of an alkali metal compound, more particularly an alkali metal inorganic compound.

The amount of alkali metal compound deposited on the nickel oxide need only be a promoter amount. Good results are obtained with deposits of from about 0.01 to 0.2 weight percent, especially 0.05 to 0.1 weight percent, as alkali metal.

The following examples serve to illustrate the preparation of massive nickel catalysts. Examples I, II and IV–VI are not catalysts of this invention but are included to show how to apply the initial noble metal deposit.

EXAMPLE I

Clean nickel turnings, 472 grams, were packed into a 42 cubic inch exhaust emission converter. After packing, the converter with the nickel turnings was dipped in 50 percent nitric acid, then rinsed with tap water.

A 1,500 ml. solution of 1 percent nitric acid containing 1.0 gram of palladium nitrate was prepared. The catalyst converter with turnings was then immersed in this solution for 15 minutes. After draining and rinsing, the catalyst and converter were dried at 300° F. overnight.

Thereafter, the temperature of the furnace was raised to 1000° F. and the converter and catalyst were allowed to stay in this environment for 3 hours.

EXAMPLE II

After the nickel catalyst of Example I was tested for exhaust gas catalyst activity in accordance with Example VII, the entire converter and turnings were cleaned by immersion in 50 percent nitric acid. Thereafter, the catalyst containing cartridge was immersed for a half-hour in a solution of 2 percent nitric acid containing 10 grams of palladium nitrate. After draining and rinsing in tap water, the catalyst and converter were air dried. Thereafter, the cartridge and catalyst were placed in a furnace at 1000° F. and left there overnight.

Two samples of this catalyst were found to contain 0.29 and 0.42 weight percent palladium.

EXAMPLE III

After the resultant product of Example II was submitted to testing according to the provisions of Example VII, the used catalyst was rinsed with 50 percent $HNO_3$ acid and then with water.

The converter with catalyst was then immersed in a 1500 ml. 2 percent $HNO_3$ solution containing 5.0 g. of $Pd(NO_3)_2$. The immersion time was 20 minutes.

After rinsing the cartridge and catalyst with water, it was dipped into 1500 ml. of a solution containing 5 percent acetic acid to which had been added 20 g. of $Li_2CO_3$. The cartridge was dried, then heated to 1100° F. overnight. Analysis on two samples indicated LiO 0.06 and 0.12 weight percent as lithium.

It is not necesary to apply the alkali metal values to the nickel substrate after it has been exposed to use conditions. Similar results are obtained when the alkali metal salt treatment is conducted before exposure to use conditions.

EXAMPLE IV

A nickel foam with a 30 (0.030″) pore size was doped using palladium nitrate. For this, a slightly acid $HNO_3$ solution was used (10 ml. in 250 ml. of water). To this was added one gram of $Pd'(NO_3)_2$. The salt was difficult to solubilize, therefore, small amounts were added at a time while the solution was warmed (50–65° C.) and continuously stirred.

The nickel foam was immersed in the solution for 5 minutes. Within a minutes the nickel turned color—black grey. After immersion, the foam was dried. Analysis indicated the foam contained 0.07 and 0.09 weight percent Pd. In a similar manner, rhodium was plated on another sample of nickel foam. The product had 0.2 weight percent rhodium.

EXAMPLE V

A nickel foam of 30 mil pore size which had been doped with about 0.1 weight percent Pd was treated with 25–30 percent $HNO_3$ solution by immersion for approximately 30 seconds and then rinsing in cold running water. This was repeated.

After the acid etch, the foam was redipped in a mixture of 1 gram $Pd(NO_3)_2$, 250 ml. $H_2O$, and 10 ml. conc. $HNO_3$. The foam was redipped for about 15–20 seconds in the $HNO_3$ and then dipped in the $Pd(NO_3)_2$-containing solution for a few minutes again.

After drying, the foam was submitted for chemical analysis which indicated 0.32 weight percent Pd.

EXAMPLE VI

Roasted nickel turnings, 542 grams, were pressed into a 42 cubic inch capacity converter. The charged converter was rinsed with 50 percent nitric acid, then rinsed with water and then immersed in a 2 percent acid solution containing 10 grams of palladium nitrate. The volume of this solution was 1500 ml. and the immersion time was 30 minutes.

After immersion, the cartridge with catalyst was dried at 175° C. for three hours in circulating air. It was then placed in a furnace at 540° C. and kept under nitrogen overnight.

The catalysts of Examples IV–VII are readily converted to catalysts of this invention by applying a surface deposit of an alkali metal compound. This can be accomplished by merely immersing them in an aqueous solution of an alkali metal compounds in the manner described in Example III.

Following the procedures of the above examples, catalysts are prepared from nickel turnings, sheet, lath, wires, screens, and foams such that they contain from 0.05 to 1 weight percent of a metal selected from the class consisting of rhodium, iridium, palladium, or platinum, and about 0.01–0.2 weight percent alkali metal. The foams are produced by the procedures of the above-cited patents, for example, U.S. 3,983,597; 2,917,384; or 3,111,396. The solutions used for doping contain from 0.05 to 10 weight percent of a chloride or nitrate of the metal to be deposited. Deposition is conducted using up to seven immersions, each immersion after the first being preceded by a dip in $HNO_3$, 10 to 50 percent concentrated. Each immersion is for a period of from 1 to 60 minutes.

Similarly, catalysts are prepared by depositing, as described above, palladium, platinum, iridium, or rhodium, by this technique on nickel-plated steel wires, and screen where the nickel plate is 1 to 10 mils thick. Similarly, the above deposition techniques are used to prepare noble metal-containing catalysts from Monel, wires, screen saddles, turnings, and foam where the Monel has a composition within the range

|  | Wt. percent |
|---|---|
| Si | 0.5–3.5 |
| Mn | 0.5–1.5 |
| Fe, maximum | 3.0 |
| Cu | 28–32 |
| Ni, remainder | |

For the depositions as described above, the dippings in the noble metal ion containing solutions are conducted with the solution having a temperature of from 20–100° C.

Following the deposition of the noble metal, a surface deposit of lithium, sodium or potassium compound is placed on any of the noble metal-nickel catalysts made by the above procedures by contacting same with a weakly acidic solution of the chloride, bromide, carbonate, or nitrate of the alkali metal followed by drying at 400 to 750° C. for a period of 2 to 24 hours. The alkali metal content of the objects can be made from 0.01 to about 0.2 weight percent. The pH of the solution is made from about 6.5 to 2.0—the higher values in this range being especially useful when employing an alkali metal carbonate as a source of alkali metal values. The temperature of the solution is from 20–100° C. and up to seven immersions in alkali metal-containing solution for 1 minute to 2 hours each are employed.

EXAMPLE VII

To demonstrate emission reduction, an olds single cylinder engine was used. The engine was run at 1340 RPM and a load was applied by an induction motor to keep the engine speed substantially constant. The fuel employed was clear Indolene; the engine timing was 10° BTC.

The engine air flow was about 23.5 pounds per hour. Inlet air temperature to carburetor was 145° C. The A/F ratio was varied from 13.0:1 to 17.0:1 using a knock test engine carburetor. With the fuel used the stoichiometric air/fuel ratio is 14.6. Values below this are termed "rich" and values above this are termed "lean." This range of $A/F$ ratios gave fuel times of 85 to 111 seconds per 25 ml. of fuel.

The catalyst bed was 10" from the exhaust port in the head. The exhaust pipe and the catalyst converter were both insulated. The exhaust temperature into the catalyst ranged from 1100°–1200° F. The catalyst converter was filled with the catalyst to be tested and had a capacity of about 42 cubic inches. Another converter which was used had a capacity of 22 cubic inches.

After the engine was warmed up, exhaust gas was sampled before and after the catalyst. The $A/F$ ratio is then varied by adjusting the carburetor and the exhausted sampled again after equilibrium, until the range of $A/F$ ratio is covered by different settings of air/fuel ratio. Hydrocarbon concentration is measured by a flame ionization detector. Carbon monoxide and $NO_x$ are measured by non-dispersive infrared. Oxygen is measured polarographically.

Data is given below as percent reduction for CO, hydrocarbons and $NO_x$. The value "percent reduction" is obtained as follows:

Percent reduction = 100

$$ \times \frac{\text{Concentration before catalyst bed} - \text{Concentration after catalyst bed}}{\text{Concentration before catalyst bed}}. $$

In the following table, results for CO, $NO_x$, and HC (hydrocarbons) are reported for various fuel ratios. Runs 1, 2, 3, and 4 were conducted using a 42 cubic inch capacity catalytic converter. Run 1 was conducted using nickel turnings. Run 2 was conducted using nickel turnings having a surface deposit of 0.1 weight percent palladium from Example I. Run 3 was conducted using nickel turnings having a surface deposit of 0.3 weight percent palladium from Example II. Run 4 was conducted using nickel turnings having a surface deposit of 0.3 weight percent palladium and a lithium oxide spike as prepared in Example III.

carbon monoxide content of exhaust gas under lean conditions is so low that it does not materially affect the $NO_x$ measurements. Hence, for the purpose of describing the effects of the present catalysts under lean conditions, the above described carbon monoxide interference does not apply.

After a surface deposit of palladium is placed on the nickel turnings as shown in Runs 2 and 3 the catalytic activity on $NO_x$ begins to extend into the "lean" range. For example, in Run 1 nickel turnings had no effect on $NO_x$ at an $A/F$ ratio of 15. However, deposition of palladium showed some effectiveness at 15. At an $A/F$ ratio of 14.5, which is closed to stoichiometric, Run 3 showed a sharp increase in $NO_x$ reduction.

Run 4 demonstrates the contribution of the present invention. As with the nickel catalysts, good $NO_x$ reduction was obtained under rich operating conditions. As explained previously, the actual reduction under such conditions was substantially higher than indicated in the table and, in fact, exceeded 90 percent. However, the catalysts retained effectiveness well into the lean region. At an $A/F$ ratio of 15 the $NO_x$ reduction was 54 percent, and even at an $A/F$ ratio of 15.5 the reduction was 5 percent.

In a further embodiment of the invention the massive nickel first receives a deposit of noble metal and is then heated to a temperature of about 1000–2200° F. and subsequently receives a deposit of alkali metal compound. This step-wise deposition procedure with an interim heat treatment has been found to give a final catalyst which retains activity to a greater degree under lean operating conditions. The function of the heat treatment is not known but it is believed that this causes the noble metal such as palladium to form a solid solution on the nickel surface which is benefitted to a greater extent by the alkali metal promoter.

Preferably the heat treatment is conducted by merely exposing the massive nickel having a noble metal deposit thereon to the hot exhaust gas of an internal combustion

| Air/fuel ratio | 13.5 | 14.0 | 14.5 | 15.0 | 15.5 | 16.0 | 16.5 | |
|---|---|---|---|---|---|---|---|---|
| Percent reduction: | | | | | | | | |
| 1. Nickel turnings | 60 | 68 | 30 | 0 | 0 | 0 | 0 | $NO_x$ |
|  | 0 | 0 | 0 | 0 | 8 | 16 | 25 | HC |
|  | 0 | 0 | 0 | 12 | 14 | 30 | 28 | CO |
| 2. Nickel turnings plus 0.1 percent Pd | 50 | 61 | 30 | 5 | 0 | 0 | 0 | $NO_x$ |
|  | 0 | 5 | 20 | 54 | 45 | 36 | 30 | HC |
|  | 0 | 2 | 12 | 44 | 34 | 23 | 23 | CO |
| 3. Nickel turnings plus 0.3 percent Pd | 55 | 63 | 69 | 2 | 3 | 4 | 0 | $NO_x$ |
|  | 0 | 14 | 87 | 84 | 83 | 80 | 98 | HC |
|  | 0 | 8 | 60 | 66 | 62 | 58 | 53 | CO |
| 4. Nickel turnings plus 0.3 percent Pd plus lithium oxide spike. | 59 | 69 | 72 | 54 | 5 | 0 | 0 | $NO_x$ |
|  | 0 | 4 | 19 | 80 | 75 | 71 | 72 | HC |
|  | 0 | 0 | 15 | 54 | 58 | 60 | 60 | CO |

As the above test results show, nickel turnings are quite effective in reducing $NO_x$ content of exhaust gas under "rich" operating conditions. In fact, nickel catalysts are more effective than the table indicates because it has been found that with the particular instrument used in these tests to measure $NO_x$ concentration, carbon monoxide interfered, which resulted in higher $NO_x$ readings both before and after the catalyst. It was found that under rich operating conditions the $NO_x$ content of the exhaust gas after contacting the nickel catalyst was practically nil and, thus, under rich operating conditions the percent reduction of $NO_x$ was actually consistently over 90 percent.

The above correction does not apply to $NO_x$ values measured under "lean" operating conditions because the engine. The exposure time can vary from about 30 minutes to about 24 hours.

Excellent results have been obtained by placing the catalysts in the exhaust gas of a cold started engine and operating the engine for about two hours. Good results are also obtained by repeating this treatment starting with a cold engine each time and allowing the engine to heat up.

The superior results obtained according to this embodiment of the invention are shown by the following tests. The test employed was the single cylinder engine test previously described. In Run 5 the catalyst was nickel turnings having a 0.3 weight percent palladium deposit. After running in the engine test, this same catalyst was lithium doped to contain about 0.08 percent lithium. It was then used in Runs 6, 7 and 8. Results obtained are shown in the following table.

|  | Run 5 (Ni-Pd) | | | | | | | Run 6 (Ni-Pd-Li) | | | | | | |
|---|---|---|---|---|---|---|---|---|---|---|---|---|---|---|
| A/F ratio | 13.1 | 13.7 | 14.2 | 14.8 | 15.2 | 15.7 | 16.9 | 13.3 | 13.8 | 14.2 | 14.9 | 15.3 | 15.7 | 16.1 | 16.5 |
| Percent HC red | 0 | 0 | 13.3 | 50 | 66 | 66 | 80 | 60.7 | 51.6 | 36 | 42.8 | 25 | 33.3 | 16.6 | 20 |
| Percent CO red | 0 | 0 | 18.7 | 50 | 58 | 83 | 80 | 55 | 44.7 | 33 | 50 | 25 | 36 | 50 | 50 |
| Percent NO$_x$ red | 47 | 59 | 69 | 60 | 4.7 | 5 | 7 | 61.8 | 70.7 | 76 | 85 | 76 | 39.7 | 12.4 | 0 |

|  | Run 7 (Ni-Pd-Li) | | | | | | | Run 8 (Ni-Pd-Li)[1] | | | | | | |
|---|---|---|---|---|---|---|---|---|---|---|---|---|---|---|
| A/F ratio | 13.2 | 13.7 | 14.4 | 14.7 | 15.3 | 15.8 | 16.4 | 17.1 | 13.2 | 13.8 | 14 | 14.5 | 15.1 | 15.4 | 16.3 | 17 |
| Percent HC red | 53.8 | 50 | 53.8 | 75 | 80 |  |  |  | 21.4 | 20 | 21 | 50 | 50 | 37 | 60 | 0 |
| Percent CO red | 67 | 40 | 45 | 50 | 33 | 54.5 | 37 | 57 | 30 | 29.7 | 40 | 57 | 8.3 | 0 | 0 | 16 |
| Percent NO$_x$ red | 55 | 60 | 73 | 79 | 73 | 49 | 14.9 | 0 | 48 | 60 | 68 | 76 | 72 | 83 | 37 | 0 |

[1] Catalyst retaining screen was found to be broke after this run.

Another series of tests were conducted on a massive nickel catalyst in the same manner as before. In Run 9 the catalyst was nickel turnings having a palladium deposit. Run 10 is the same catalyst after lithium doping. Run 11 is a repeat of Run 10 showing the continued improvement of the catalyst on subsequent exposure to exhaust gas.

|  | Run 9 (Ni-Pd) | | | | | | | Run 10 (Ni-Pd-Li) | | | | | | | Run 11 (Ni-Pd-Li) | | | | | | |
|---|---|---|---|---|---|---|---|---|---|---|---|---|---|---|---|---|---|---|---|---|---|
| A/F ratio | 13.3 | 13.7 | 14.2 | 14.7 | 15.1 | 15.4 | 16.1 | 16.6 | 13.3 | 13.8 | 14.1 | 14.8 | 15.1 | 15.4 | 15.8 | 16.4 | 13.2 | 13.5 | 14.1 | 14.5 | 15 | 15.4 | 15.9 | 16.3 |
| Percent HC red | 0 | 1 | 15 | 77 | 74 | 72 | 67 | 63 | 14.4 | 8.2 | 11.1 | 67 | 50 | 41 | 43 | 62 | 0 | 0 | 19 | 65 | 60 | 60 | 57 | 67 |
| Percent CO red | 0 | 0 | 20 | 75 | 83 | 80 | 88 | 75 | 16 | 5.4 | 18 | 50 | 33 | 55 | 50 | 50 | 5 | 0 | 33 | 63 | 60 | 20 | 43 | 62 |
| Percent NO$_x$ red | 57 | 67 | 77 | 65 | 7.8 | 3.3 | 5.9 | 0 | 58 | 71 | 76 | 81 | 63 | 21 | 0 | 0 | 57 | 67 | 79 | 86 | 84 | 81 | 11 | 7.3 |

The above results clearly demonstrate that the catalysts of this invention make it possible to achieve substantial reduction in exhaust NO$_x$ while still operating under lean conditions at which exhaust hydrocarbons and carbon monoxide are minimal. For example, in Run 11, at an A/F ratio of 15.4, actual NO$_x$ reduction was from 1025 p.p.m. to an after catalyst 200 p.p.m.—an 81 percent reduction. At this A/F ratio the exhaust gas entering the catalyst bed contained 1.4 weight percent oxygen, which demonstrates that the catalyst effectively reduces NO$_x$ even in the presence of substantial quantities of oxygen such as are encountered under lean conditions.

What is claimed is:

1. A method for reducing the amount of nitrogen oxides, hydrocarbons and carbon monoxide in internal combustion engine exhaust gas, said method being especially adapted for use with an engine operating at an air/fuel ration above stoichiometric, said method comprising contacting at engine exhaust temperatures said exhaust gas produced by operating said engine at an air-fuel ratio up to about 15.5 with massive nickel having a surface deposit thereon of a catalytic promoter quantity of a noble metal and of an alkali metal compound.

2. A method of Claim 1 wherein said alkali metal is selected from the class consisting of lithium, potassium and sodium.

3. A method of Claim 2 wherein said alkali metal is lithium.

4. A method of Claim 1 wherein said noble metal is a first surface deposit and said alkali metal compound is a second surface deposit.

5. A method of Claim 1 wherein said noble metal is palladium.

6. A method of Claim 5 wherein said alkali metal is lithium.

7. A method of Claim 6 wherein said palladium is a first surface deposit and said lithium compound is a second surface deposit.

References Cited

UNITED STATES PATENTS

| 3,259,453 | 7/1966 | Stiles | 423—214 |
| 3,334,055 | 8/1967 | Dowden et. al. | 252—573 |
| 3,362,783 | 1/1968 | Leak | 423—213 |
| 3,444,099 | 5/1967 | Taylor et. al. | 423—213 X |

FOREIGN PATENTS

| 470,894 | 8/1937 | Great Britain |
| 732,164 | 4/1966 | Canada |

GEORGE O. PETERS, Primary Examiner

U.S. Cl. X.R.

60—301; 252—474